US011965497B2

(12) United States Patent
Barnhouse

(10) Patent No.: US 11,965,497 B2
(45) Date of Patent: Apr. 23, 2024

(54) RECIPROCATING PUMP FLUID CYLINDER SLEEVE ASSEMBLY

(71) Applicant: Caterpillar Inc., Peoria, IL (US)

(72) Inventor: James Anthony Barnhouse, Spring, TX (US)

(73) Assignee: Caterpillar Inc., Peoria, IL (US)

( * ) Notice: Subject to any disclaimer, the term of this patent is extended or adjusted under 35 U.S.C. 154(b) by 1 day.

(21) Appl. No.: 17/680,241

(22) Filed: Feb. 24, 2022

(65) Prior Publication Data

US 2022/0282719 A1 Sep. 8, 2022

Related U.S. Application Data

(60) Provisional application No. 63/157,340, filed on Mar. 5, 2021.

(51) Int. Cl.

| | |
|---|---|
| ***F04B 19/22*** | (2006.01) |
| ***B25B 13/48*** | (2006.01) |
| ***B25B 13/50*** | (2006.01) |
| ***B25B 27/14*** | (2006.01) |
| ***F04B 1/0538*** | (2020.01) |
| ***F04B 53/00*** | (2006.01) |
| ***F04B 53/02*** | (2006.01) |

(Continued)

(52) U.S. Cl.
CPC .............. *F04B 19/22* (2013.01); *F04B 53/16* (2013.01); *F04B 53/164* (2013.01); *F04B 53/168* (2013.01); *B25B 13/481* (2013.01); *B25B 13/50* (2013.01); *B25B 27/14* (2013.01); *F04B 1/0538* (2013.01); *F04B 53/007* (2013.01); *F04B 53/008* (2013.01); *F04B 53/02* (2013.01); *F04B 53/166* (2013.01); *F04B 53/22* (2013.01)

(58) Field of Classification Search
CPC ........ F04B 19/22; F04B 53/16; F04B 53/164; F04B 53/168; F04B 1/0538; F04B 9/042; F04B 53/007; F04B 53/008; F04B 53/02; F04B 53/162; F04B 53/166; F04B 53/22; B25B 13/48; B25B 13/481; B25B 13/50; B25B 27/14; F16J 15/18; F16J 15/187; F16J 15/189
See application file for complete search history.

(56) References Cited

U.S. PATENT DOCUMENTS 3,489,098 A * 1/1970 Roth ........................ F16J 15/18
92/128
3,776,558 A 12/1973 Maurer
(Continued)

FOREIGN PATENT DOCUMENTS

EP 0935050 A2 8/1999

*Primary Examiner* — Kenneth J Hansen
*Assistant Examiner* — David N Brandt

(57) ABSTRACT

A reciprocating pump includes a fluid end having a body defining a plunger bore that engages a plunger sleeve with a threaded interface, where the plunger sleeve defines throughbore configured to receive a plunger operatively reciprocating within the plunger bore during operation of the reciprocating pump. A packing assembly including a plurality of stacked annular seals is disposed between the plunger sleeve and the plunger. A packing nut having a threaded profile for engagement with a threaded surface of the plunger bore asserts a load against the packing assembly to ensure a positive engagement with the plunger.

19 Claims, 8 Drawing Sheets

(51) Int. Cl.

| | |
|---|---|
| ***F04B 53/16*** | (2006.01) |
| ***F04B 53/22*** | (2006.01) |

(56) References Cited

U.S. PATENT DOCUMENTS

| | | | | | |
|---|---|---|---|---|---|
| 4,878,815 | A * | 11/1989 | Stachowiak | F04B 53/1025 417/454 |
| 4,911,480 | A * | 3/1990 | Bridges | E21B 33/03 285/123.6 |
| 5,375,812 | A * | 12/1994 | Kent | F16K 41/04 277/550 |
| 9,976,372 | B2 | 5/2018 | Guidry | |
| 10,591,070 | B2 | 3/2020 | Nowell | |
| 10,822,888 | B2 | 11/2020 | Sim | |
| 11,421,680 | B1 * | 8/2022 | Smith | F04B 53/166 |
| 2016/0319626 | A1 * | 11/2016 | Dille | F16L 15/04 |
| 2018/0202434 | A1 * | 7/2018 | Barnhouse, Jr. | F16J 15/18 |
| 2020/0109804 | A1 | 4/2020 | Nguyen | |
| 2020/0182240 | A1 | 6/2020 | Nowell | |
| 2021/0308840 | A1 * | 10/2021 | Benz | F04B 53/22 |

* cited by examiner

RECIPROCATING PUMP FLUID CYLINDER SLEEVE ASSEMBLY

RELATED APPLICATION

The present patent application claims the benefit of U.S. Provisional Patent Application No. 63/157,340 filed on Mar. 5, 2021, which is incorporated herein by reference in its entirety.

FIELD

The present disclosure relates to positive displacement pumps, and in particular, to a reciprocating pump fluid cylinder sleeve assembly.

BACKGROUND

Hydraulic fracturing (a.k.a. fracking) is a process to obtain hydrocarbons such as natural gas and petroleum by injecting a fracking fluid or slurry at high pressure into a wellbore to create cracks in deep rock formations. The hydraulic fracturing process employs a variety of different types of equipment at the site of the well, including one or more positive displacement pumps, slurry blender, fracturing fluid tanks, high-pressure flow iron (pipe or conduit), wellhead, valves, charge pumps, and trailers upon which some equipment are carried.

Positive displacement pumps are commonly used in oil fields for high pressure hydrocarbon recovery applications, such as injecting the fracking fluid down the wellbore. A positive displacement pump typically has two sections, a power end and a fluid end. The power end includes a crankshaft powered by an engine that drives the plungers. The fluid end of the pump includes cylinders into which the plungers operate to draw fluid into the fluid chamber and then forcibly push out at a high pressure to a discharge manifold, which is in fluid communication with a well head. A seal assembly, also called a packing assembly or stuffing box, disposed in the cylinder chamber of the pump housing is used to prevent leakage of frac fluid from around the plunger during pumping operations.

DETAILED DESCRIPTION

During the operation of a positive displacement pump, the dynamic seal packing around the plunger will often wear out and sometimes fail, causing damage to the sealing surface of the hydraulic fracturing fluid end block. At this point, the fluid end block will need expensive repair or be scrapped. This type of repair is expensive and time-consuming. The solution described herein uses a sacrificial sleeve around the plunger bore to prevent damage to the hydraulic fracturing fluid end block in the case of packing seal failure. The plunger sleeve described herein has a threaded interface with the fluid end block. The present disclosure describes two sealing designs: a rod seal and a face seal. If the packing seal fails and the sacrificial sleeve becomes damaged, the sleeve can be easily removed and a new sleeve installed. The sleeve and seal arrangement provide relatively inexpensive and reliable solutions for remedying washboarding and/or washout of a packing segment of the plunger bore of the pump. The use of the sleeve also increases the longevity of a fluid cylinder of the pump and thereby reduces operating and maintenance costs.

Figure 1:
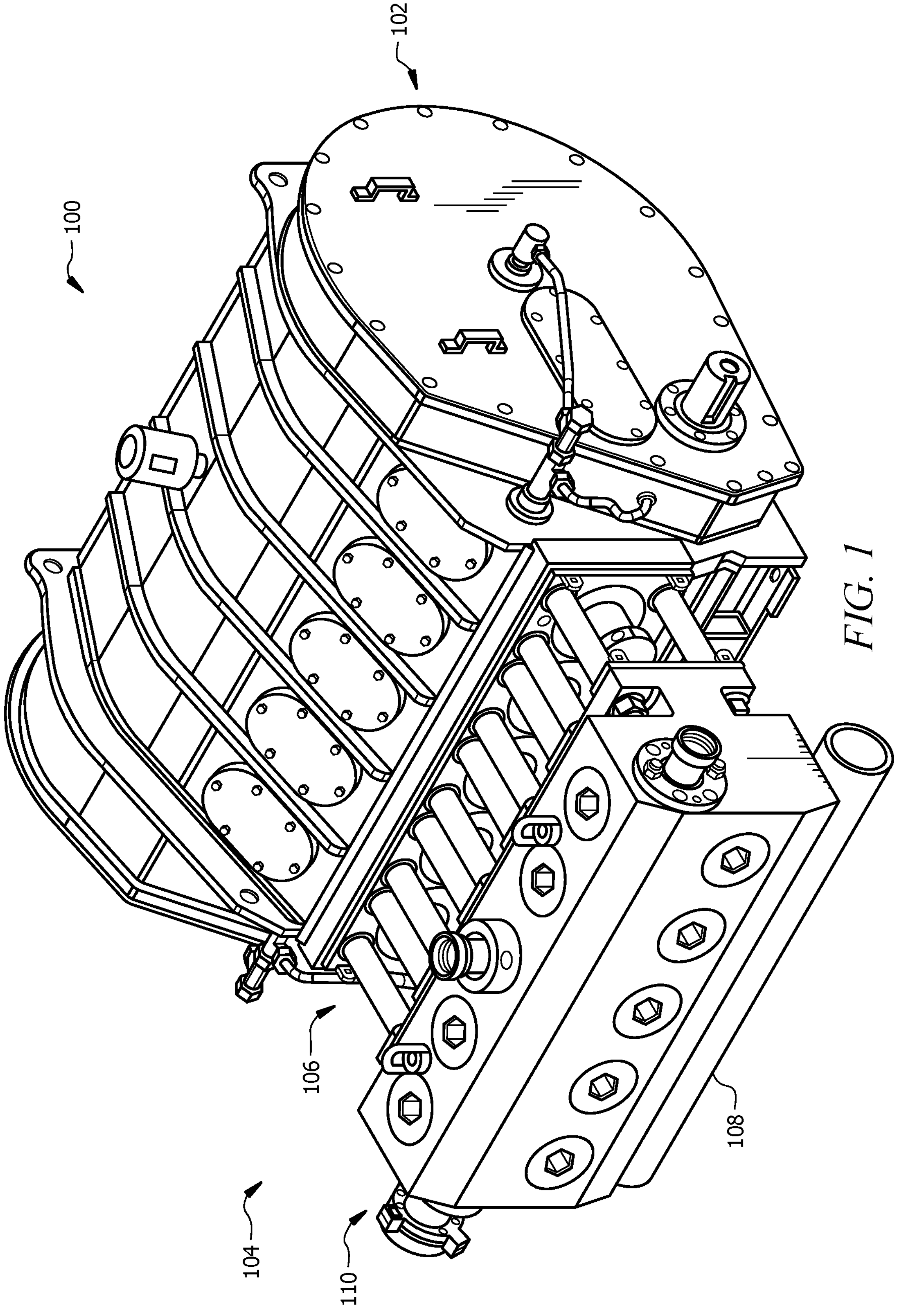
FIG. 1 is a perspective view of an embodiment of a positive displacement pump according to the teachings of the present disclosure.

As shown in FIG. 1, a positive displacement reciprocating pump 100 has a power end 102 operatively coupled to a fluid end 104 via a plurality of stay rods 106. The fluid end 104 has a fluid end block 105 that includes a suction manifold 108 connected to a fluid source that supplies a fracturing fluid that is commonly called a slurry, which is a mixture of water, abrasive proppants (silica sand or ceramic), and corrosive chemical additives. The fluid end 104 is also coupled to a discharge manifold 110 that discharges the fluid at high pressure from the pump 100 into an encased wellbore. The pump 100 can also be used to inject a cement mixture down the wellbore for cementing operations. The pump 100 may be freestanding on the ground, mounted to a skid, or mounted to a trailer.

Figure 2:
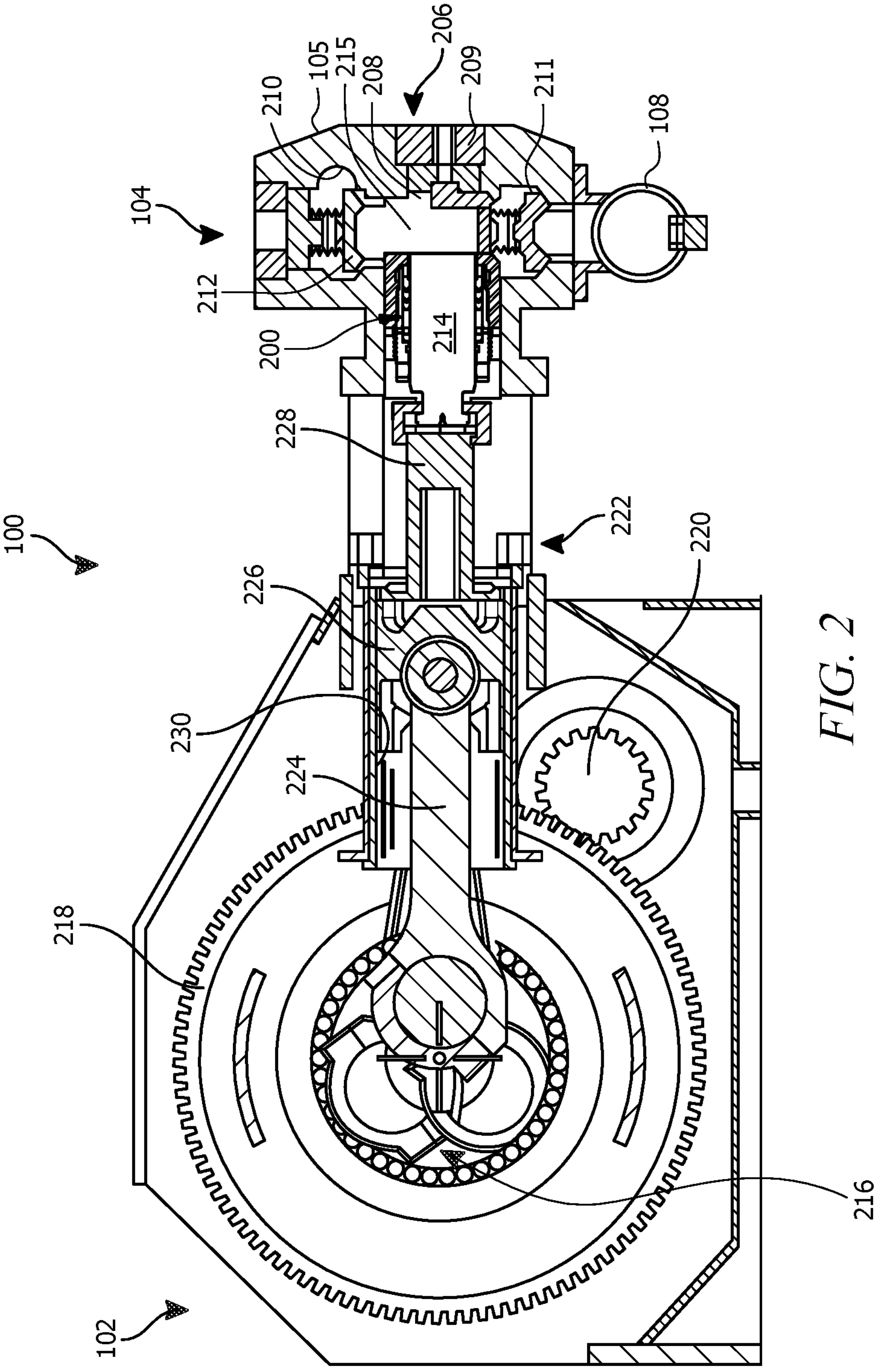
FIG. 2 is a cross-sectional side view of an embodiment of a positive displacement pump according to the teachings of the present disclosure.

FIG. 2 is a cross-sectional view of a reciprocating pump 100 that incorporates a sacrificial plunger bore sleeve 200 described herein. The pump 100 includes a power end 102 operably coupled to a fluid end 104 having a fluid end block 105 (also referred herein as fluid end body 105). The fluid end block 105 has a plurality of chambers formed therein, including a plurality of cylinder chambers 208 (only one shown in FIG. 2). Each of the cylinder chambers 208 is in communication with a suction manifold 108 and a discharge port 210. A suction cover plate 209 connects to an end of each cylinder chamber 208 on a rearward side of the fluid-end block 105 opposite the stay rods 106. A suction valve 211 opens the cylinder chamber 108 to the suction manifold 108 during the intake stroke of the pump. A discharge valve 212 opens the discharge port 210 of the cylinder chamber 208 during the discharge stroke.

The fluid end 104 further includes plungers 214 that extend through plunger bores 215 defined in the cylinder chambers 208. Each plunger 214 is adapted to reciprocate within the corresponding cylinder chamber 208 during operation of the reciprocating pump 100. The power end 102 of the reciprocating pump 100 includes a crankshaft 216 that includes one or more crank throws, corresponding to the one or more cylinders 206 of the fluid end 104, and a main shaft. The crank throws are connected to the main shaft and are each offset from the rotational axis of the crankshaft 216. The crankshaft 216 is mechanically coupled to a power source (not shown) via a bull gear 218 and a pinion 220. The bull gear 218 is attached to the crankshaft 216 and the pinion 220 is connected to a power source or motor (not shown). The gear teeth of the bull gear 218 mesh with the gear teeth of the pinion 220, thereby transmitting torque therebetween. The crank throws are each coupled to a respective one of the plungers 214 via a mechanical linkage 222, each of which includes a connecting rod 224, a crosshead 226, and a pony rod 228. Each of the crossheads 226 is disposed within a corresponding crosshead bore 230, within which the crosshead 226 is adapted to reciprocate. The connecting rods 224 connect respective ones of the crossheads 226 to respective ones of the crank throws. Further, the pony rods 228 connect respective ones of the crossheads 226 to respective ones of the plungers 214.

In operation, the power source or motor (not shown) rotates the shaft of the pinion 220, which rotates the pinion gear teeth that engage the bull gear 218 and the crankshaft 216. The crankshaft 216 rotates the crank throws about the central axis of the main shaft. The crank throws, in turn, are operable to drive the mechanical linkages 222, including respective ones of the connecting rods 224, the crossheads 226, and the pony rods 228, causing the crossheads 226 to reciprocate within the corresponding crosshead bores 230. The reciprocating motion of the crossheads 226 is transferred to respective ones of the plungers 214 via the pony rods 228, causing the plungers 214 to reciprocate within the corresponding fluid chambers 208. As the plungers 214 reciprocate within the respective fluid chambers 208, fluid is allowed into the fluid cylinders 206 from the suction manifold 108 and, thereafter, discharged from the fluid cylinders 206 into the discharge manifold 110.

Figure 3:
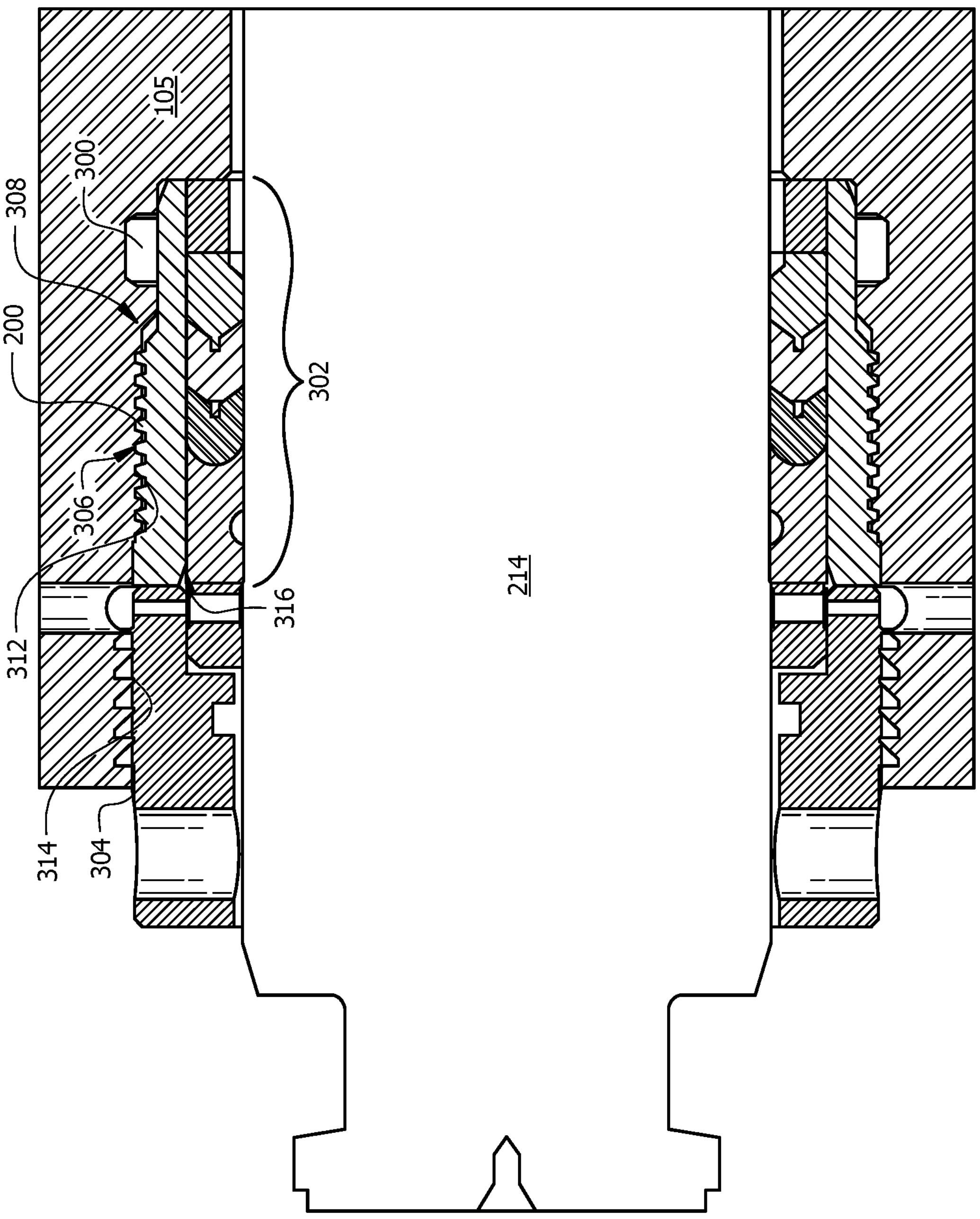
FIG. 3 is a partial cross-sectional side view of an embodiment of a plunger sleeve assembly with a rod seal installed within a fluid cylinder according to the teachings of the present disclosure.

FIG. 3 is a more detailed partial cross-sectional view of the fluid cylinder showing an embodiment of the plunger sleeve 200 using a rod seal 300 (e.g., having an annular body) disposed at the outside diameter of the sleeve. The fluid end of the pump includes a body 105 having a plunger bore 215 that includes an inner wall having first and second inner diameter threaded surfaces 312 and 314. The plunger bore 215 further incorporates a seal assembly 302. The seal assembly 302, also commonly called a packing, a seal packing, a packing assembly, a packing stack, or stuffing box, is disposed in the cylinder chamber around the plunger 214 to prevent leakage of frac fluid from around the plunger during pumping operations. The packing assembly 302 includes multiple individual annular metallic and/or elastomer seal components (e.g., junk ring, header ring, pressure ring, adapter ring, spacer ring) inserted into a stuffing box successively to form the seal packing during installation. This seal stack is energized by a packing nut 304 that is also installed in machined contours and an inner diameter threaded surface 314 defined in the fluid end body 105. The packing nut 304 preloads the seal stack to ensure positive engagement with the plunger 214. To remedy washboarding and/or washout of the inner wall of the plunger bore 215, the fluid cylinder incorporates a plunger sleeve 200 (e.g., having a tubular or annular body) disposed between the packing assembly 302 and the inner wall of the plunger bore 215 of the fluid cylinder. The plunger sleeve 200 may be fabricated from a hard durable material or having a coating selected from the group consisting of steel, a tungsten carbide composite, a non-ferrous metal, and a non-metallic composite material now known or later to be developed.

The plunger sleeve 200 includes a throughbore 316 that accommodates the plunger 214 as it reciprocates during operations of the reciprocating pump 100. The plunger sleeve 200 includes an outer diameter surface that incorporates a threaded profile 306 configured to engage the threaded surface 312 formed in the fluid end block 105. The threaded interface defined between the sleeve 200 and the block may employ any standard thread profile. Alternatively, a modified stub ACME thread with a rounded or larger root radius may be used. The plunger sleeve 200 includes an inner wall that defines the throughbore 316 and the packing assembly 302 is received within the throughbore 316 of the sleeve such that the packing extends radially between an exterior surface of the plunger 214 and the inner wall of the plunger sleeve 200. The packing 302 seals the radial gap defined between the plunger 214 and the inner wall of the plunger sleeve 200 to facilitate sealing the plunger 214 within the plunger bore of the fluid cylinder.

Figure 4:
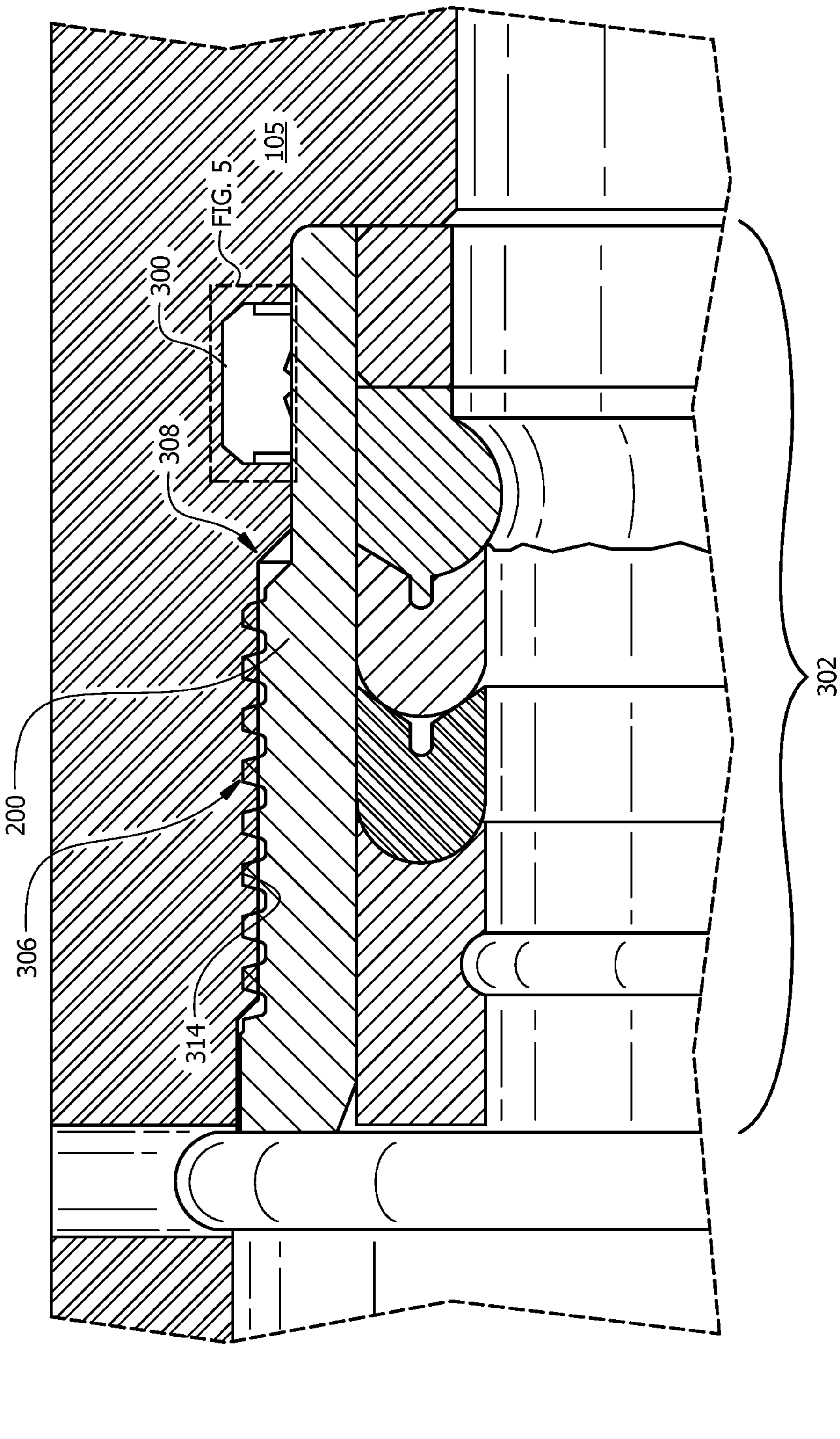
FIG. 4 is a more detailed partial cross-sectional side view of a plunger sleeve assembly with a rod seal installed within a fluid cylinder according to the teachings of the present disclosure.
Figure 5:
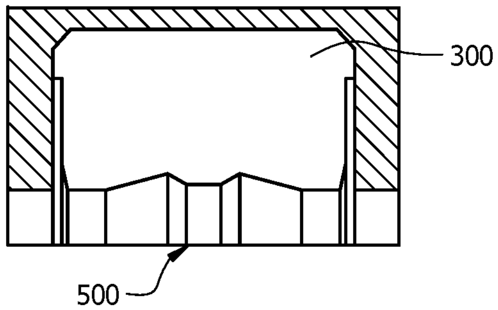
FIG. 5 is a cross-sectional view of the rod seal according to the teachings of the present disclosure.

As shown in FIGS. 3-5, the plunger sleeve 200 includes a step 308 that defines first and second segments of the plunger sleeve 200. A first segment of the plunger sleeve 200 defined on a first side of the step 308 (e.g., disposed inside the rod seal 300) may have a thinner wall, compared to an adjacent, or adjoining, second segment of the plunger sleeve 200 defined on a second side of the step 308. An outer diameter of the first segment may be less than an outer diameter of the second segment. The rod seal 300 is disposed at an outside diameter surface of the plunger sleeve 200 spaced from the packing assembly 302 and functions to prevent intrusion of hydraulic fluids if the seal packing 302 fails. The rod seal 300 has an inner diameter profile 500 that is contoured to have higher and lower features to cause sealing against the outside diameter of the plunger sleeve 200 (FIG. 3). The plunger sleeve is omitted from FIG. 5 in order to more clearly illustrate the inner diameter profile 500.

Figure 6:
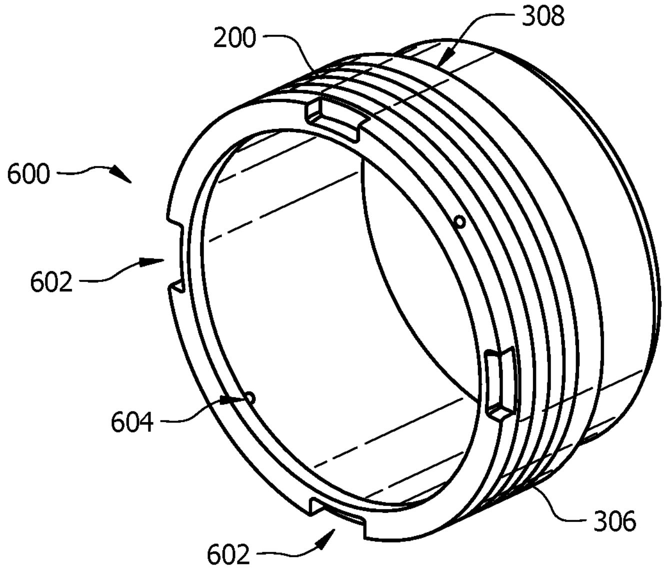
FIG. 6 is a perspective view of an embodiment of a plunger sleeve according to the teachings of the present disclosure.
Figure 7:
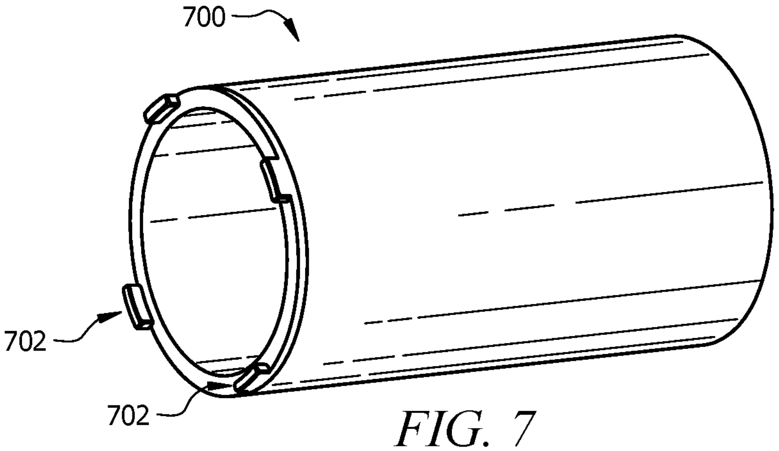
FIG. 7 is a perspective view of an embodiment of an installation tool according to the teachings of the present disclosure.
Figure 11:
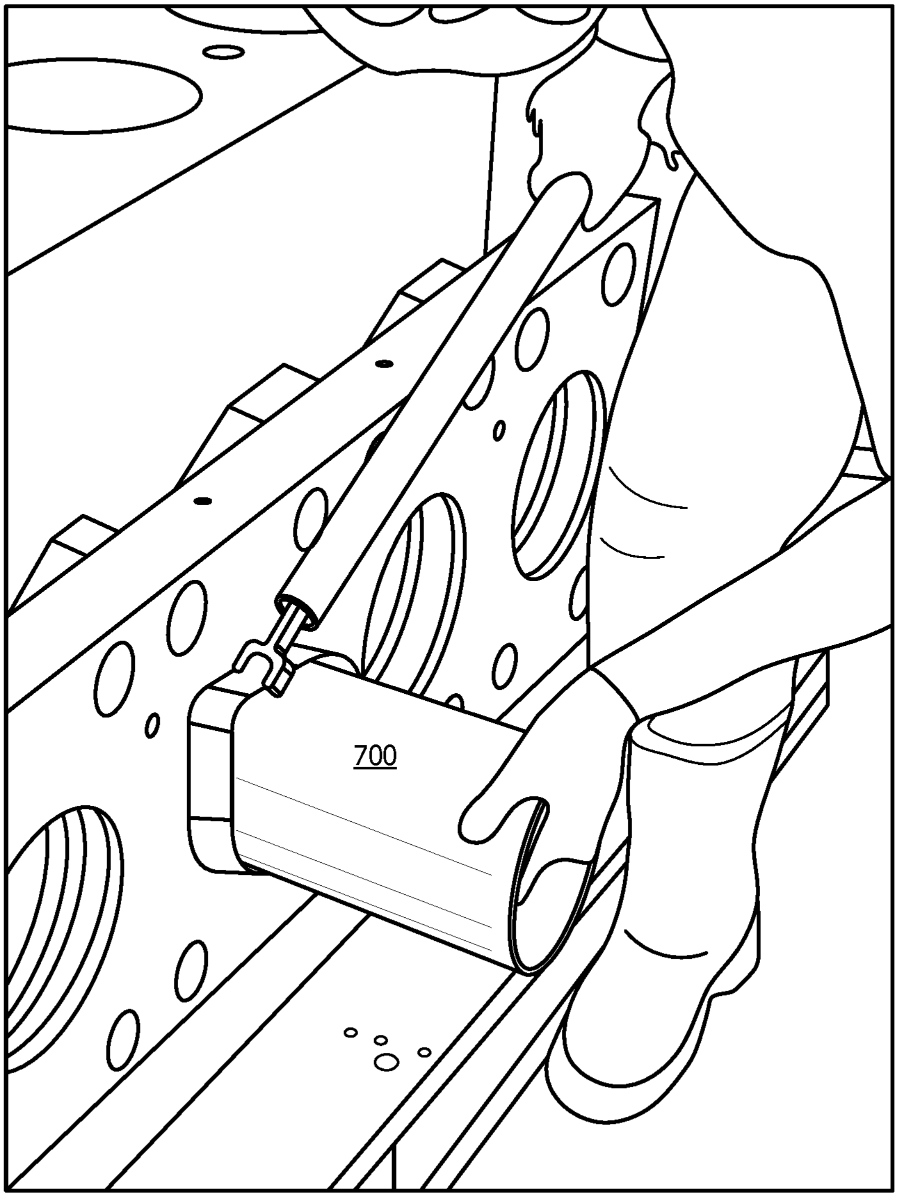
FIG. 11 is a perspective view of a conventional chain wrench being used to secure and rotate the installation tool.

Referring to FIG. 6, the plunger sleeve 200 further includes a tool engagement structure 600 configured as a castle feature on one annular end that is designed to interface with a custom installation tool 700 shown in FIG. 7. One end of the cylindrical installation tool 700 is contoured with equidistant rectangular projections or flanges 702 that correspond to equidistant rectangular indentations 602 on the end of the plunger sleeve 200. To install the plunger sleeve 200, the installation tool 700 is used to rotate the plunger sleeve 200 so that the threaded profile 306 interfaces with the threaded face of the bore. A chain wrench 1200, such as that shown in FIG. 11, may be used to securely grab and rotate the installation tool 700 where its castle features 702 engage or mesh with the indentations 602 of the plunger sleeve 200. Once the plunger sleeve 200 is advanced to its proper position within the cylinder bore, a plurality of set screws may be advanced radially inward to secure the plunger sleeve 200 in place via through-holes 604 in the walls of the plunger sleeve 200 and prevent further rotation.

It should be noted that the tool engagement interface of the plunger sleeve 200 and the corresponding face of the custom installation tool 700 may incorporate alternate profiles that permit the installation tool to grip the plunger sleeve tightly to enable rotation thereof so that it may advance along the threaded interface with the plunger bore during installation, and retreat along the same threaded interface during removal and maintenance. For example, the alternate tool engagement profile may utilize triangular teeth or engagement features of other suitable shapes.

Figure 8:
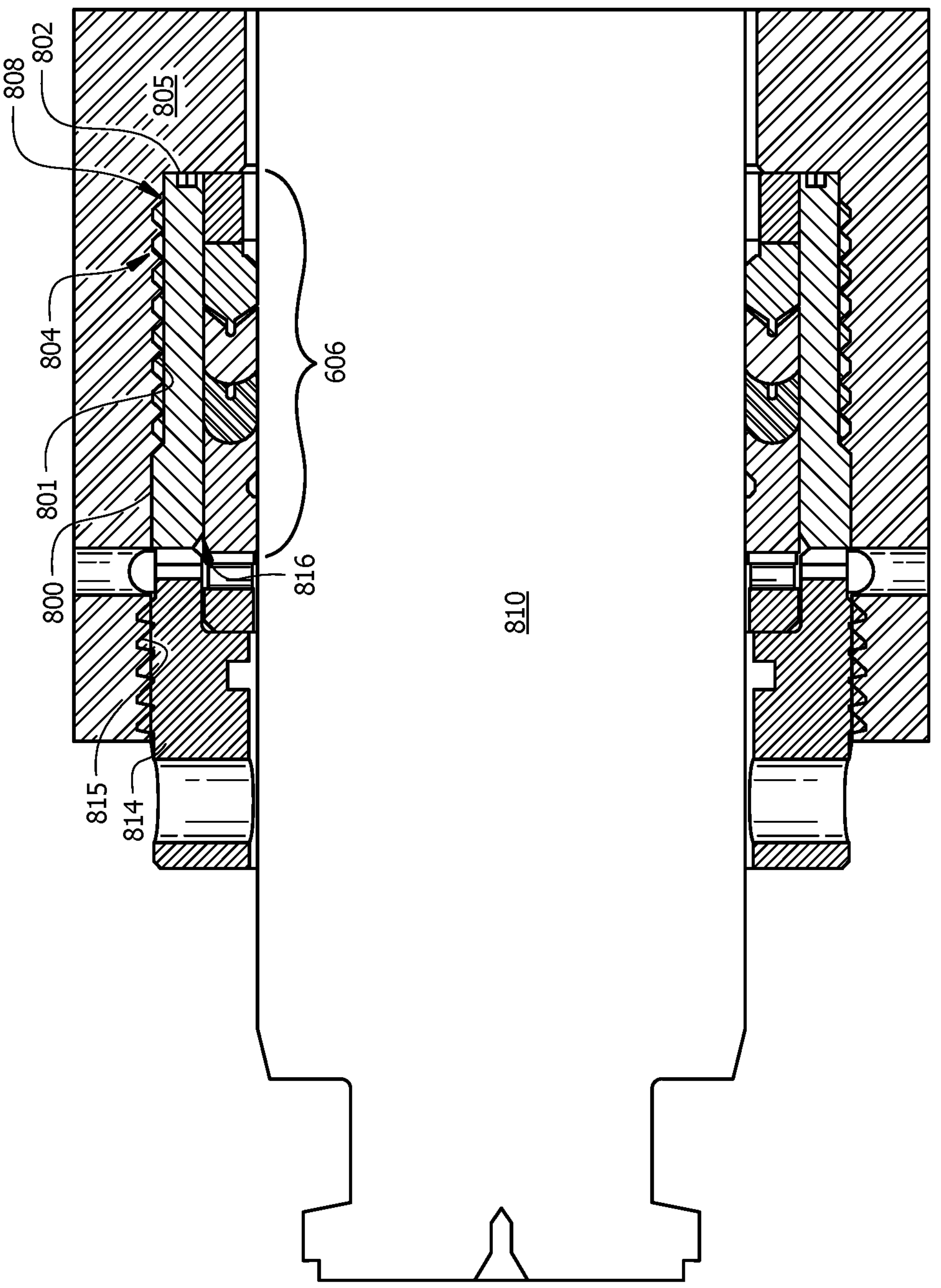
FIG. 8 is a partial cross-sectional side view of a second embodiment of a plunger sleeve assembly with a face seal installed within a fluid cylinder according to the teachings of the present disclosure.
Figure 9:
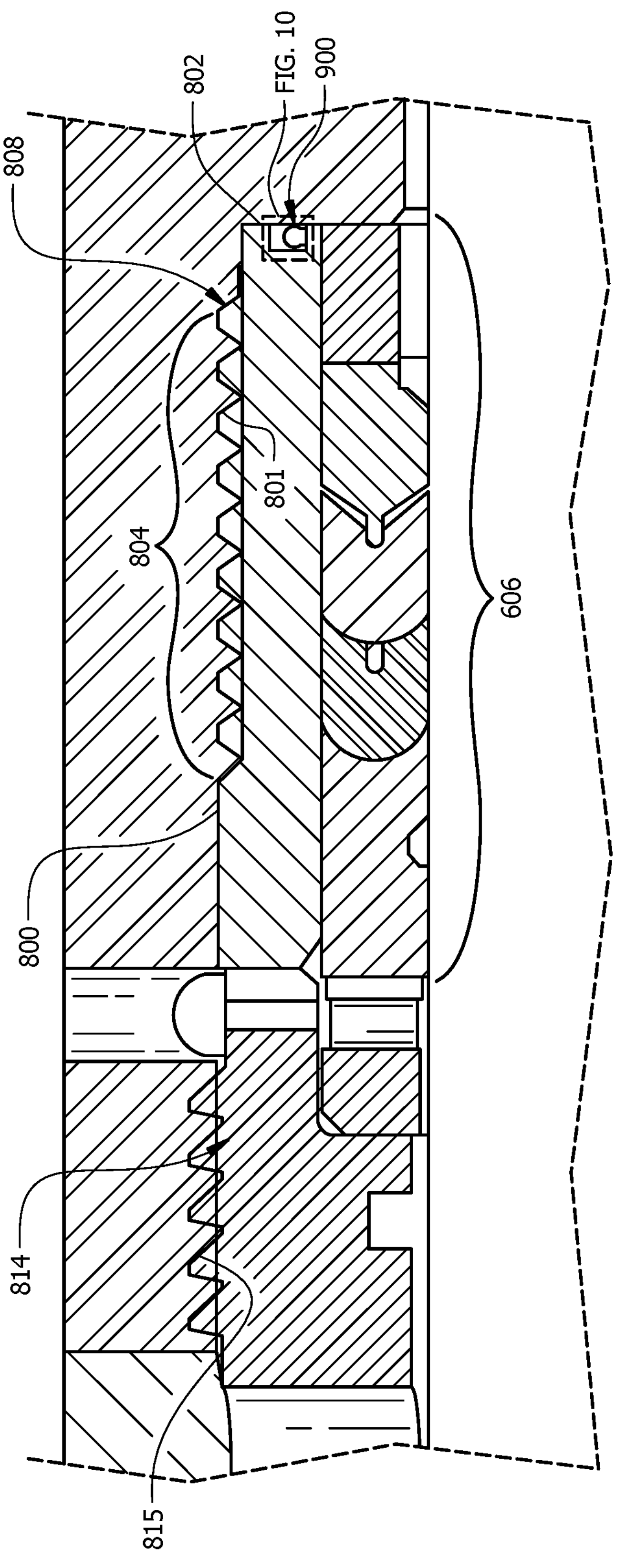
FIG. 9 is a more detailed partial cross-sectional side view of the second embodiment of a sleeve assembly with a face seal installed within a fluid cylinder according to the teachings of the present disclosure.
Figure 10:
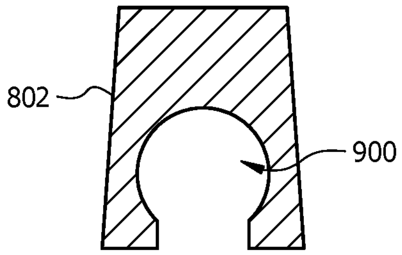
FIG. 10 is a cross-sectional view of the face seal according to the teachings of the present disclosure.

FIGS. 8-10 provides various views of another embodiment of the plunger sleeve 800 incorporating an annular face seal 802. The plunger sleeve 800 also includes an outer diameter surface that incorporates a threaded profile 804 configured to engage a threaded profile 801 formed in the fluid end block 805. The threaded interface 804 may employ any standard thread profile. Alternatively, a modified stub ACME thread with a rounded or larger root radius may be used. The plunger sleeve 800 includes an inner wall that defines a throughbore 816 (or an internal passage) and a packing assembly 806 is received within the throughbore 816 of the sleeve such that the packing seal assembly 606 extends radially between an exterior surface of the plunger 810 and the inner wall of the sleeve 800. The packing assembly 606 seals the radial gap defined between the plunger 810 and the inner wall of the sleeve 800 to facilitate sealing the plunger within the plunger bore of the fluid cylinder. The packing assembly 606 is disposed in the cylinder chamber around the plunger 810 to prevent leakage of frac fluid from around the plunger during pumping operations. The packing assembly 606 includes multiple individual annular metallic and/or elastomer seal components (e.g., junk ring, header ring, pressure ring, adapter ring, spacer ring) inserted into a stuffing box successively to form the seal packing during installation. This seal stack 606 is energized by a packing nut 814 that is also installed in machined contours and threaded surface 815 in the fluid end block 805. The packing nut 814 preloads the seals 606 to insure its positive energized engagement with the plunger 810. The plunger sleeve 800 may further incorporate a step 808 that defines first and second segments of the plunger sleeve 800. A first segment of the plunger sleeve 800 defined on a first side the step 808 may have a thinner wall, compared to an adjacent or adjoining second segment of the plunger sleeve 800 defined on a second side of the step 808. An outer diameter of the first segment may be less than an outer diameter of the second segment.

As shown in FIGS. 8 and 9, the plunger sleeve 800 incorporates an annular groove 812 at the inward facing end in which the annular face seal 802 is disposed. The annular face seal 802 is disposed at the end face of the plunger sleeve 800 spaced from the packing assembly 606 and functions to prevent the intrusion of hydraulic fluids if the seal packing 606 fails. As shown in FIG. 10, the annular face seal 802 may feature a keyhole groove 900 facing toward an inner diameter thereof. A metal energizer ring (not shown) may be used with the annular face seal 802.

Similar to the plunger sleeve 200 shown in FIG. 6, the plunger sleeve 800 shown in FIG. 8 also includes a tool engagement profile that may include castle features on one annular end that is designed to interface and engage with the same custom installation tool 700 shown in FIG. 7. One end of the cylindrical installation tool 700 is contoured with equidistant rectangular flanges that correspond to equidistant rectangular indentations on the end of the plunger sleeve 800. To install the plunger sleeve 800, the installation tool is used to rotate the sleeve so that its threaded face interfaces with the threaded face of the plunger bore. The same chain wrench, such as that shown in FIG. 11, may be used to securely grab and rotate the installation tool 700 that engages the castle feature end of the plunger sleeve 800. Once the plunger sleeve 800 is advanced to its proper position within the plunger bore, a plurality of set screws may be used to secure the sleeve in place via through-holes in the walls of the sleeve to prevent further rotation.

Certain embodiments of the disclosure provide a fluid cylinder for a fluid end section of a reciprocating pump includes a body having a pressure chamber and a plunger bore that fluidly communicates with the pressure chamber. The plunger bore includes a packing segment configured to hold a packing assembly. The fluid cylinder includes a plunger sleeve received within the seal packing segment of the plunger bore. The interface of the plunger bore and the sleeve includes a threaded interface for securely engaging and retaining the plunger sleeve within the plunger bore. The plunger sleeve is configured to hold the plunger within its throughbore such that the plunger is configured to reciprocate within the plunger bore during operation of the reciprocating pump. The fluid cylinder includes a retention mechanism secured within the plunger bore such that the retention mechanism is configured to retain the sleeve within the packing segment of the plunger bore.

The features of the present invention which are believed to be novel are set forth below with particularity in the appended claims. However, modifications, variations, and changes to the exemplary embodiments described above will be apparent to those skilled in the art, and the plunger sleeve assembly for the packing bore described herein thus encompasses such modifications, variations, and changes and are not limited to the specific embodiments described herein.

What is claimed is:

1. A fluid end of a reciprocating pump, the fluid end comprising:

a body defining a plunger bore, the body having a first inner diameter threaded surface and a second inner diameter threaded surface, wherein the first inner diameter threaded surface and the second inner diameter threaded surface are oriented on two offset interior surfaces of the body;

a plunger sleeve having a first threaded profile along an exterior-facing surface of the plunger sleeve, the first threaded profile configured for engagement with the first inner diameter threaded surface of the body, the plunger sleeve defining a throughbore configured to receive a plunger reciprocating within the plunger bore during operation of the reciprocating pump, the plunger sleeve including a first end and a second end, wherein the first end of the plunger sleeve is closer than the second end of the plunger sleeve to a power end of the reciprocating pump;

a packing assembly including at least one annular seal disposed between the plunger sleeve and the plunger; and a packing nut having a second threaded profile along an exterior-facing surface of the packing nut within the plunger bore of the body, the second threaded profile being configured for engagement with the second inner diameter threaded surface of the body, the packing nut including a first end and a second end, wherein the first end of the packing nut is closer than the second end of the packing nut to the power end of the reciprocating pump, and wherein the second end of the packing nut contacts the first end of the plunger sleeve within the fluid end.

2. The fluid end of claim 1, further comprising a rod seal disposed between the plunger sleeve and the plunger bore, the rod seal having a contoured inner diameter profile engaging the plunger sleeve.

3. The fluid end of claim 1, further comprising an annular seal disposed at an outside diameter of the plunger sleeve.

4. The fluid end of claim 1, further comprising an annular seal separate from the packing assembly and disposed in an annular groove at an end face interface between the plunger sleeve and the plunger bore.

5. The fluid end of claim 4, wherein the annular seal disposed at the end face interface between the plunger sleeve and the plunger bore comprises a keyhole groove.

6. The fluid end of claim 1, wherein the first end of the plunger sleeve comprises a plurality of circumferential indentations configured for engagement with a plurality of circumferential flanges of an installation tool.

7. The fluid end of claim 1, wherein the first end of the plunger sleeve comprises a tool engaging contour configured for engagement with a corresponding circumferential contour of an installation tool operable to rotate the plunger sleeve to advance along the first inner diameter threaded surface of the body.

8. A fluid cylinder for a fluid end section of a reciprocating pump, the fluid cylinder comprising:
- a body defining a plunger bore, the body having a first inner diameter threaded surface and a second inner diameter threaded surface;
- a plunger sleeve having a first threaded profile configured for engagement with the first inner diameter threaded surface of the body, the plunger sleeve defining a throughbore configured to receive a plunger reciprocating within the plunger bore during operation of the reciprocating pump;
- a packing assembly including at least one annular seal disposed between the plunger sleeve and the plunger;
- a packing nut having a second threaded profile for engagement with the second inner diameter threaded surface of the body; and
- a separate annular seal spaced from the packing assembly, the separate annular seal disposed between the plunger sleeve and the plunger bore,
- wherein the first threaded profile and the second threaded profile are positioned in the fluid end section along offset interior surfaces of the body, and
- wherein the packing nut and the plunger sleeve directly abut each other within the fluid end.

9. The fluid cylinder of claim 8, wherein the plunger sleeve has a step that defines first and second segments of the plunger sleeve, wherein an outer diameter of the first segment is less than an outer diameter of the second segment, and wherein the separate annular seal is disposed between the first segment of the plunger sleeve and the plunger bore.

10. The fluid cylinder of claim 8, wherein the separate annular seal is disposed in an annular groove at an end face interface between the plunger sleeve and the plunger bore.

11. The fluid cylinder of claim 10, wherein the separate annular seal comprises a keyhole groove.

12. The fluid cylinder of claim 8, wherein an end face of the plunger sleeve comprises a tool engaging contour configured for engagement with a corresponding circumferential contour of an installation tool operable to rotate the plunger sleeve to advance along the first inner diameter threaded surface of the plunger bore.

13. The fluid cylinder of claim 8, wherein the separate annular seal is disposed about an outer diameter of the plunger sleeve.

14. The fluid cylinder of claim 12, wherein the tool engaging contour includes a plurality of installation indentations.

15. A plunger sleeve assembly for a reciprocating pump, comprising: a tubular sleeve for installation within a plunger bore of a fluid cylinder of the reciprocating pump, the tubular sleeve having a throughbore configured to receive a plunger; the tubular sleeve having a first threaded profile disposed on an outer surface thereof for engagement with a first threaded surface of the plunger bore; and a first end face of the tubular sleeve having a tool engaging contour with a plurality of installation indentations located at an intersection of the first end face and a circumferential external surface of the tubular sleeve, the tool engaging contour configured for engagement with a corresponding circumferential contour of an installation tool, the installation tool operable to rotate the tubular sleeve to advance along the first threaded surface of the plunger bore; and a packing nut having a second threaded profile for engagement with a second threaded surface of the plunger bore, wherein the packing nut, when installed in the fluid cylinder, is configured to apply an axial load against a packing assembly to cause positive engagement of the packing assembly with the plunger.

16. The plunger sleeve assembly of claim 15, wherein the tubular sleeve has a step that defines first and second segments of the plunger sleeve, wherein an outer diameter of the first segment is less than an outer diameter of the second segment; and an annular seal disposed at an interface between the first segment of the plunger sleeve and the plunger bore.

17. The plunger sleeve assembly of claim 15, wherein the tubular sleeve has a second end face defining an annular groove configured to receive an annular seal to be disposed at an interface between the tubular sleeve and the plunger bore.

18. The plunger sleeve assembly of claim 15, wherein a plurality of through-holes are defined in the tubular sleeve, the plurality of through-holes configured to receive a plurality of set screws for securing the tubular sleeve within the plunger bore.

19. The plunger sleeve assembly of claim 15, further comprising a packing assembly including a plurality of stacked annular seals configured for sealing engagement between the tubular sleeve and the plunger.

* * * * *